United States Patent
Ferguson et al.

(10) Patent No.: US 7,778,543 B2
(45) Date of Patent: Aug. 17, 2010

(54) PASSIVE OPTICAL NETWORK ROGUE OPTICAL NETWORK UNIT DIAGNOSTICS

(75) Inventors: Julia Gay Ferguson, Raleigh, NC (US); Thomas Michael Holland, Raleigh, NC (US); Billy Chi-Kang Su, Cary, NC (US)

(73) Assignee: Alcatel Lucent, Paris (FR)

( * ) Notice: Subject to any disclaimer, the term of this patent is extended or adjusted under 35 U.S.C. 154(b) by 802 days.

(21) Appl. No.: 11/619,267

(22) Filed: Jan. 3, 2007

(65) Prior Publication Data
US 2007/0274719 A1 Nov. 29, 2007

Related U.S. Application Data

(60) Provisional application No. 60/803,317, filed on May 26, 2006.

(51) Int. Cl.
*H04B 10/08* (2006.01)
*H04B 17/00* (2006.01)

(52) U.S. Cl. .............................. 398/15; 398/2; 398/10

(58) Field of Classification Search .................... 398/2, 398/9, 10, 11, 12, 13, 14, 15
See application file for complete search history.

(56) References Cited

U.S. PATENT DOCUMENTS

| | | | |
|---|---|---|---|
| 6,108,112 A * | 8/2000 | Touma | 398/10 |
| 2003/0177216 A1* | 9/2003 | Sutherland et al. | 709/223 |
| 2006/0093356 A1 | 5/2006 | Vereen et al. | |

* cited by examiner

*Primary Examiner*—Nathan M Curs
(74) *Attorney, Agent, or Firm*—RG & Associates

(57) ABSTRACT

A system, method, and computer readable medium for passive optical network rogue optical network unit diagnostics, comprises, detecting an alarm of a network, correlating the detected alarm to a bandwidth map, and selectively disabling an optical network unit upstream to the detected alarm on the bandwidth map for a pre-determined interval.

16 Claims, 5 Drawing Sheets

PASSIVE OPTICAL NETWORK ROGUE OPTICAL NETWORK UNIT DIAGNOSTICS

CROSS REFERENCE TO RELATED APPLICATIONS

The present patent application is related to and claims the benefit of provisional patent application No. U.S. 60/803,317 filed on May 26, 2006, entitled PON ROGUE ONU DIAGNOSTICS, the entire contents of which are incorporated by reference herein.

BACKGROUND OF THE INVENTION

The present invention is generally related to optical network alarm diagnostics and, more specifically to passive optical network rogue optical network unit diagnostics.

A Passive Optical Network (PON) consists of an Optical Line Termination (OLT), which resides in a Central Office (CO). The optical line termination services a number of Optical Network Units (ONUs) typically connected in a star arrangement using optical splitters, which reside at a premise of a user. Passive optical networks are designed on the premise of time-sharing of resources. The upstream data on the passive optical network sent from the optical network units to the optical line termination is time-multiplexed between the multiple optical network units and is designed to relay data at specified intervals. Problems can arise when ONUs transmit data at times other than their allocated time which may cause data collisions or other errors. If the ONU laser stays on continuously, relays at inappropriate times or does not relay at all problems arise in the network.

The issue that the present invention addresses is to identify rogue optical network units on a passive optical network. A rogue ONU is one that has the capability of disrupting other ONUs on the PON. Currently, there are no known solutions other than manually checking the ONUs on the PON, which is tedious, time consuming and subject to human error.

Therefore what is needed is automated monitoring of ONU behavior on the PON to detect rogue ONUs and more specifically to enable identification of a rogue ONU through the problematic symptoms of other ONUs.

SUMMARY OF THE INVENTION

A rogue ONU on a PON can cause other ONUs on the PON to exhibit problematic behavior in the form of alarms such as, Bit Interleaved Parity (BIP), Bit Error Rate (BER), and re-ranging. A rogue ONU may be causing timeslot violations, it could have a laser mis-calibrated, a laser continuously on, or a laser that intermittently fails to come on. Regardless of the cause, a rogue ONU exhibits the same symptoms for all situations on the PON—alarms as defined in ITU-T standards.

It is difficult to identify a rogue ONU without manually interacting with that ONU on the PON. Manual troubleshooting is insufficient in a customer site/field situation and is tedious in in-house lab scenarios.

The present invention will monitor the problematic behavior of ONUs and use Physical Layer Administration and Maintenance (PLOAM) messaging to control which ONUs are enabled on the PON at a particular time during monitoring.

The present invention will gather information and decipher available information about BER, alarms and what ONUs are ranged on the PON—keeping a list of alarmed ONUs and how many times they alarmed. If immediately after ranging an ONU, BER and/or alarms occur on other in-service ONUs, the algorithm would be to correlate the errors with relative position of ONUs in the upstream bandwidth map. The purpose being to see if the ONUs suffering errors are those which are proximate to a particular ONU. If increasing the distance between these ONUs in the bandwidth map proves to clear errors, the ONU will be flagged as a possible rogue ONU. This ONU will be disabled via the Disable ONU PLOAM message. If the alarms and BER continue with the ONU disabled, the ONUs laser will be re-enabled as it is suspected to be a non-problematic ONU. The bandwidth map is corrected to its original state.

The system user may then use the service affecting monitoring if further diagnostics are needed. Using the list of ONUs on the PON and information about which ONUs are alarming, the present invention will disable one non-alarming ONU at a time through the Disable ONU PLOAM Message. Each non-alarming ONU on the PON will be requested to turn off its laser via the Disable ONU PLOAM message. The present invention will monitor alarms on the PON for a pre-determined interval. If the problematic behavior on the PON stops, that ONU is considered a rogue ONU and identified to the system user as disabled. If the problematic behavior is still observed on the PON, the list of ONUs alarmed is compared to existing alarms. If the number of alarms or BER decreases, the ONU is flagged as disabled and kept disabled. If the number of alarms or BER stayed the same or increased, the ONU's laser is re-enabled through the Disable ONU PLOAM message.

If additional ONUs are in the list, the algorithm moves to the next ONU in the list and starts by requesting each ONU on the PON to disable its laser. If no more ONUs are to be analyzed, the algorithm analyzes the number of alarms and BER to see if all have cleared. If all have not cleared, then its probable that one of the alarming ONUs are a suspect rogue. The algorithm disables all ONUs excluding the ONUs that have alarms present. The algorithm continues as above through the list of ONUs that have alarms, disabling each ONU one at a time, observing alarms and BER on the PON to determine whether the ONU is a rogue. Decrease of an alarm in this case is expected and taken into account in the algorithm. After all ONUs have been examined, the list of disabled ONUs is examined. If there are ONUs present in the disabled ONU list, the existence of a rogue ONU is re-verified by enabling all the lasers of the ONU(s) in the disabled ONU list and observing the alarms and/or BER reappear. The ONUs are then permanently disabled. If there are no ONUs disabled, the user is informed that the diagnostic present invention was unable to determine there to be a rogue ONU on the PON.

A major advantage of the present invention is automated determination of problematic ONUs without taking manual diagnostic measures on the PON.

In one embodiment of the present invention, a method for passive optical network rogue optical network unit diagnostics, comprises, detecting an alarm of a network, correlating the detected alarm to a bandwidth map, and selectively disabling an optical network unit next to the alarming ONU on the bandwidth map for a pre-determined interval. The method may also comprise collecting bandwidth mapping information, creating the bandwidth map and determining an optical network unit proximate to the detected alarm based upon the upstream bandwidth map. The method may additionally comprise verifying the number of detected alarms during the pre-determined interval. The ONU is flagged as a possible rogue ONU and disabled if there is a reduction in detected alarms during the pre-determined interval. In order to confirm the ONU is indeed rogue, the ONU will be re-enabled to verify that the number of alarms increases. If the number of alarms increases, the ONU is permanently disabled—wherein the alarm may be detected at the OLT and wherein the alarm may be detected at the ONU.

In a further embodiment of the present invention, a computer readable medium comprises instructions for, sequentially disabling an optical network unit on a bandwidth map proximate to an alarming optical network unit for a pre-determined interval, observing alarm information for the pre-determined interval, and listing as rogue the sequentially disabled optical network unit if the observation indicates a reduction in the number of alarms during the pre-determined interval. The computer readable medium may also comprise, enabling rogue listed optical network units, monitoring alarm information during the enablement of the rogue listed network units and acquiring the number and type of observed alarms during the pre-determined interval to determine probable rogue optical network units. The computer readable medium may additionally comprise analyzing the observed alarms to determine probable rogue optical network units.

In yet a further embodiment, a system of passive optical network rogue optical network unit diagnostics, comprises, a memory that receives at least one of, an alarm information and a bandwidth map, and a processor communicably coupled to the memory, wherein the processor, gathers the alarm information of an alarming optical network unit, correlates the gathered alarm information to the bandwidth map, disables an optical network unit upstream to the alarming optical network unit on the bandwidth map for a pre-determined interval, and observes a subsequent alarm information for the pre-determined interval. The system may also comprise an optical transmitter coupled to the processor, an optical receiver coupled to the processor and an optical transceiver coupled to the processor.

DETAILED DESCRIPTION OF THE INVENTION

Figure 1:
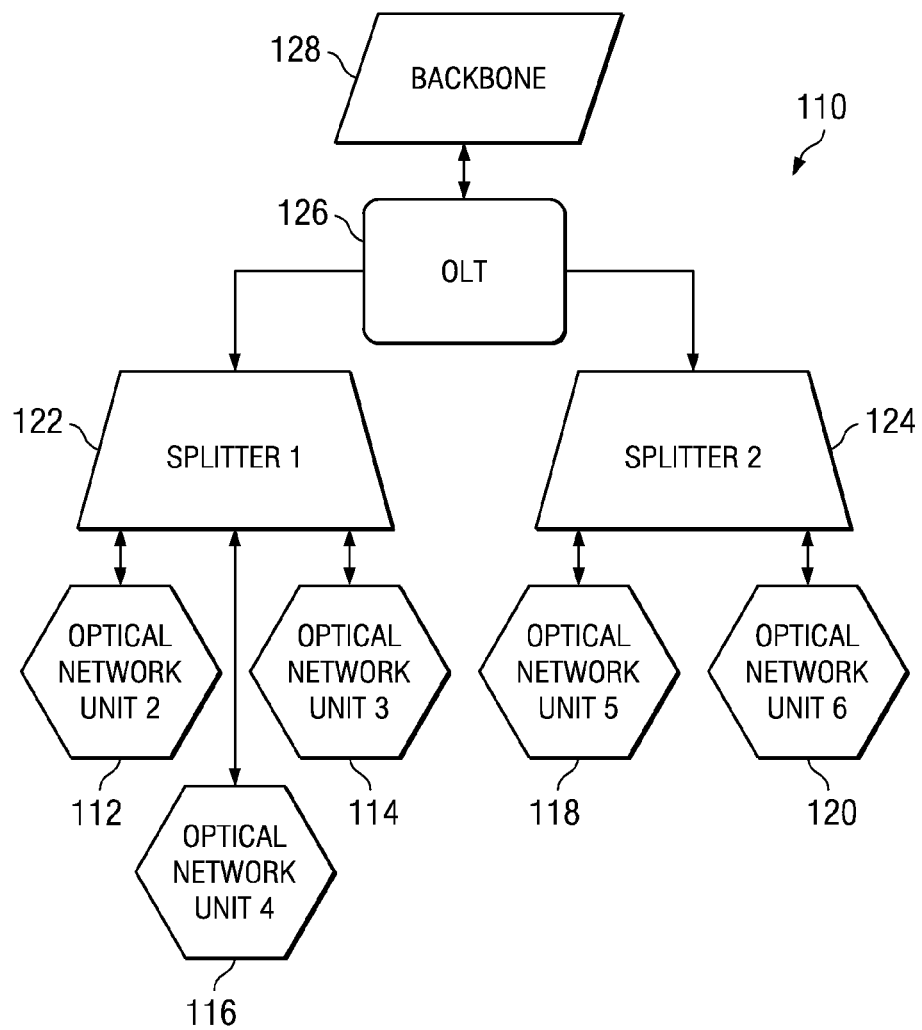
FIG. 1 illustrates a first system layout of a PON and a set of ONUs.

Referring now to FIG. 1, a network is shown in which the optical network terminations 112, 114, 116, 118, 120 branch out through splitters 122, 124 from an optical line termination 126 which is connected to the network backbone 128. The optical line termination is connected to the central backbone of the network.

Figure 2:
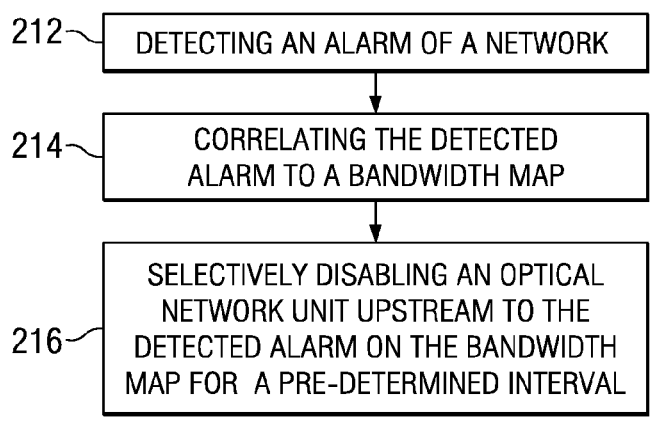
FIG. 2 illustrates a first method flow diagram listing the method steps of the method of operation of an embodiment of the present invention.

Referring now to FIG. 2, a first method of passive optical network rogue optical network unit diagnostics 210 is depicted and comprises a number of blocks or modules that are software, hardware, or firmware, and/or the combination of software, hardware, and/or firmware. A method for passive optical network rogue optical network unit diagnostics comprises, detecting 212 an alarm of a network, correlating 214 the detected alarm to a bandwidth map, and selectively disabling 216 an optical network unit proximate to the alarming ONU on the bandwidth map for a pre-determined interval. The transfer of information between the modules occurs via at least one of: a wireless protocol, a wired protocol and a combination of the wireless protocol and the wired protocol.

Figure 3:
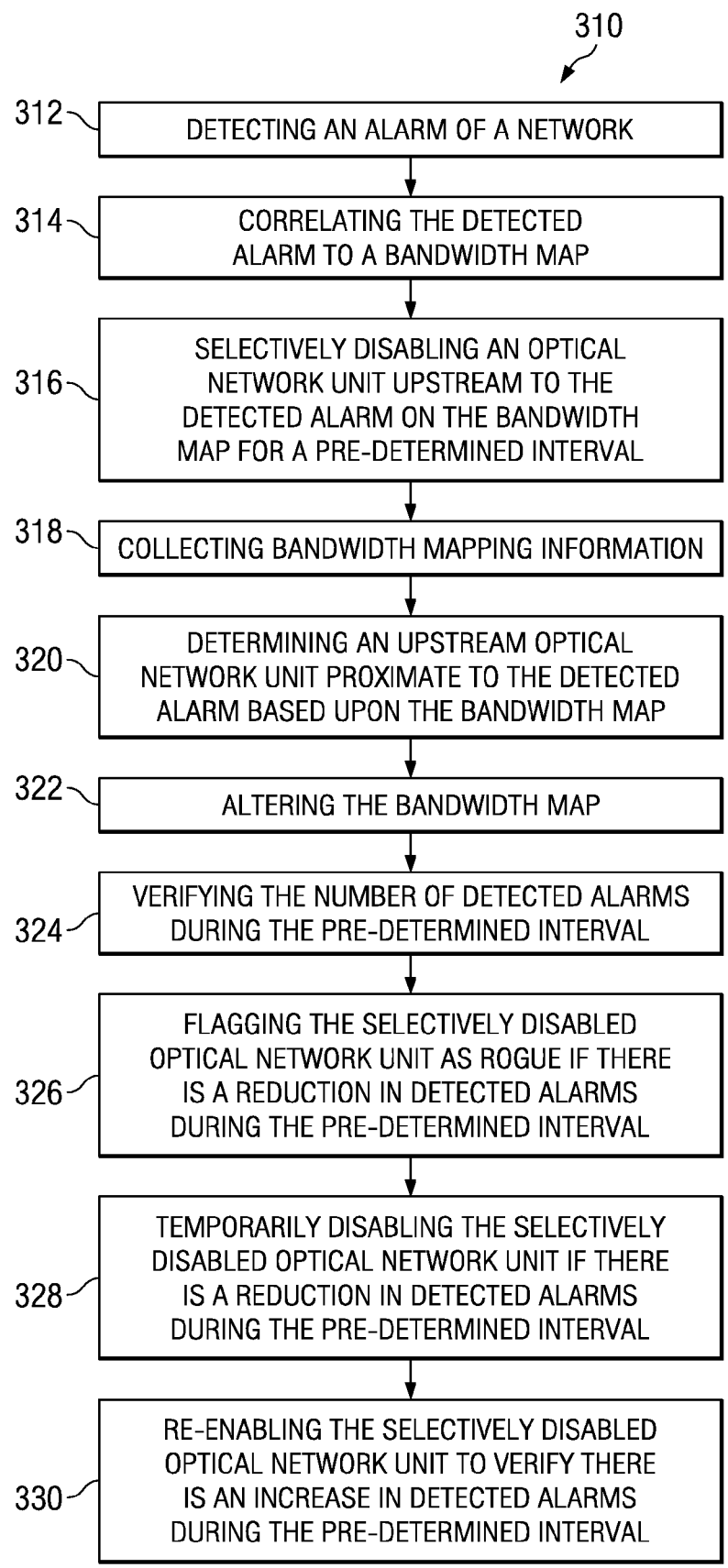
FIG. 3 illustrates a second method flow diagram listing the method steps of the method of operation of an embodiment of the present invention.

Referring now to FIG. 3, a second method of passive optical network rogue optical network unit diagnostics 310 is depicted and comprises a number of blocks or modules that are software, hardware, or firmware, and/or the combination of software, hardware, and/or firmware. A method for passive optical network rogue optical network unit diagnostics comprises, detecting 312 an alarm of a network, correlating 314 the detected alarm to a bandwidth map, and selectively disabling 316 an optical network unit upstream to the detected alarm on the bandwidth map for a pre-determined interval. The method may also comprise collecting 318 bandwidth mapping information, determining 320 an upstream optical network unit proximate to the detected alarm based upon the bandwidth map, and altering 322 the bandwidth map The method may additionally comprise verifying 324 the number of detected alarms during the pre-determined interval, flagging 326 the selectively disabled optical network unit as rogue if there is a reduction in detected alarms during the pre-determine interval, temporarily disabling 328 the selectively disabled optical network unit if there is a reduction in detected alarms during the pre-determine interval and re-enabling 330 the selectively disabled optical network unit to verify an increase in detected alarms during the pre-determine interval for rogue ONU verification. The method may comprise comparing 332 detected alarms to the selective disabling of the optical network unit and setting 334 the selectively disabled optical network unit to a permanently disabled state if the comparison indicates a reduction in detected alarms during the pre-determined interval, wherein the alarm is detected at the OLT and wherein the alarm is detected at the ONU. The transfer of information between the modules occurs via at least one of: a wireless protocol, a wired protocol and a combination of the wireless protocol and the wired protocol.

Figure 4:
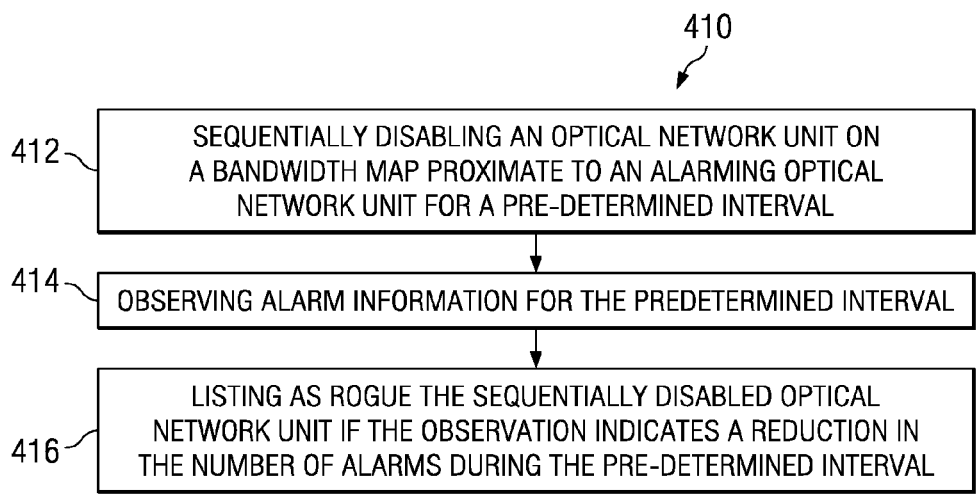
FIG. 4 illustrates a first software flow diagram in accordance with an embodiment of the present invention.

Referring now to FIG. 4, a first software flow block 410 of passive optical network rogue optical network unit diagnostics is depicted. A computer readable medium, or software, comprises instructions for, sequentially disabling 412 an optical network unit on a bandwidth map proximate to an alarming optical network unit for a pre-determined interval, observing 414 alarm information for the pre-determined interval, and listing 416 as rogue the sequentially disabled optical network unit if the observation indicates a reduction in the number of alarms during the pre-determined interval. This method is preferably embodied in a computer readable medium or software but may also be embodied in firmware and is utilized via hardware. The transfer of information between the repository and the monitor occurs via at least one of a wireless protocol, a wired protocol and the combination of the wireless protocol and the wired protocol. The steps performed in this figure are performed by software, hardware, firmware, and/or the combination of software, hardware, and/or firmware.

Figure 5:
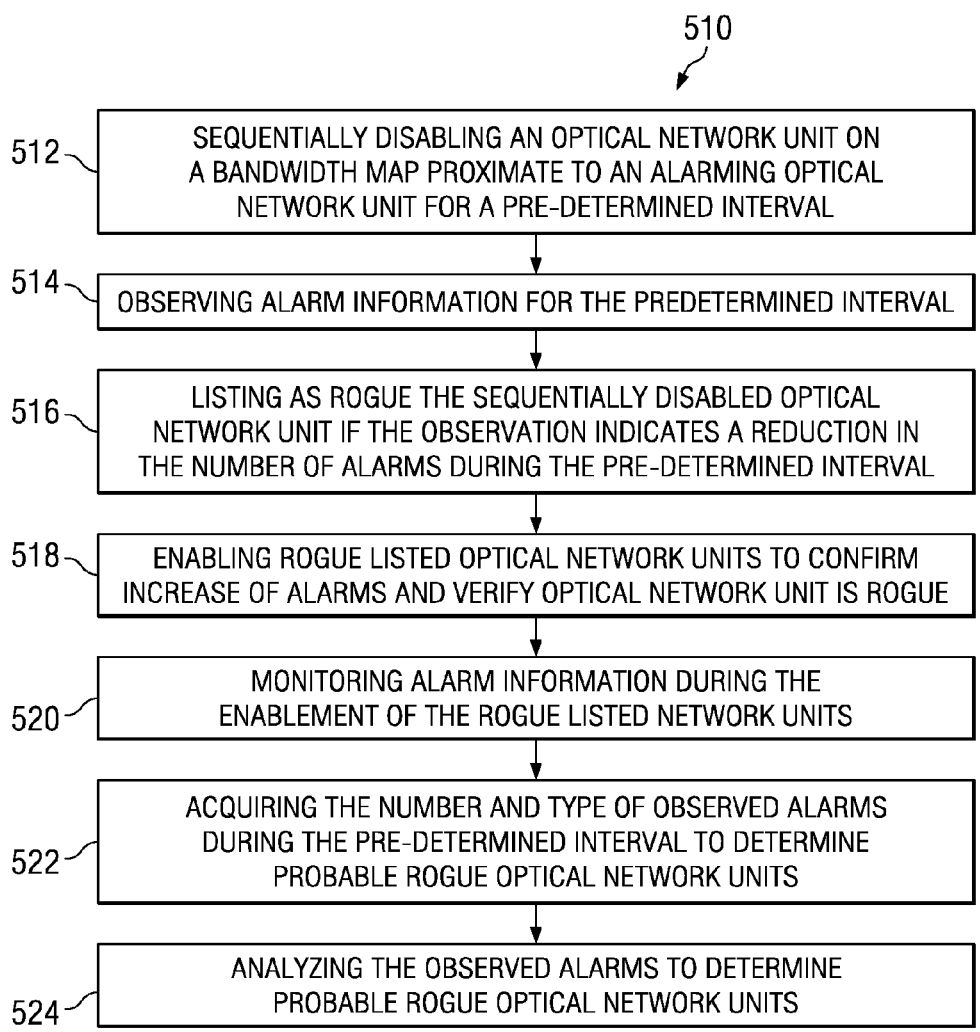
FIG. 5 illustrates a second software flow diagram in accordance with an embodiment of the present invention.

Referring now to FIG. 5, a second software flow block 510 of passive optical network rogue optical network unit diagnostics is depicted. A computer readable medium, or software, comprises instructions for, sequentially disabling 512 an optical network unit on a bandwidth map proximate to an alarming optical network unit for a pre-determined interval, observing 514 alarm information for the pre-determined interval, and listing 516 as rogue the sequentially disabled optical network unit if the observation indicates a reduction in the number of alarms during the pre-determined interval. The computer readable medium may also comprise, enabling 518 rogue listed optical network units to confirm an increase in alarm and verify the optical network unit is rogue, monitoring 520 alarm information during the enablement of the rogue listed network units and acquiring 522 the number and type of observed alarms during the pre-determined interval to determine probable rogue optical network units. The computer readable medium may additionally comprise analyzing 524 the observed alarms to determine probable rogue optical network units. This method is preferably embodied in a computer readable medium or software but may also be embodied in firmware and is utilized via hardware. The transfer of information between the repository and the monitor occurs via at least one of a wireless protocol, a wired protocol and the combination of the wireless protocol and the wired protocol. The steps performed in this figure are performed by software, hardware, firmware, and/or the combination of software, hardware, and/or firmware.

Figure 6:
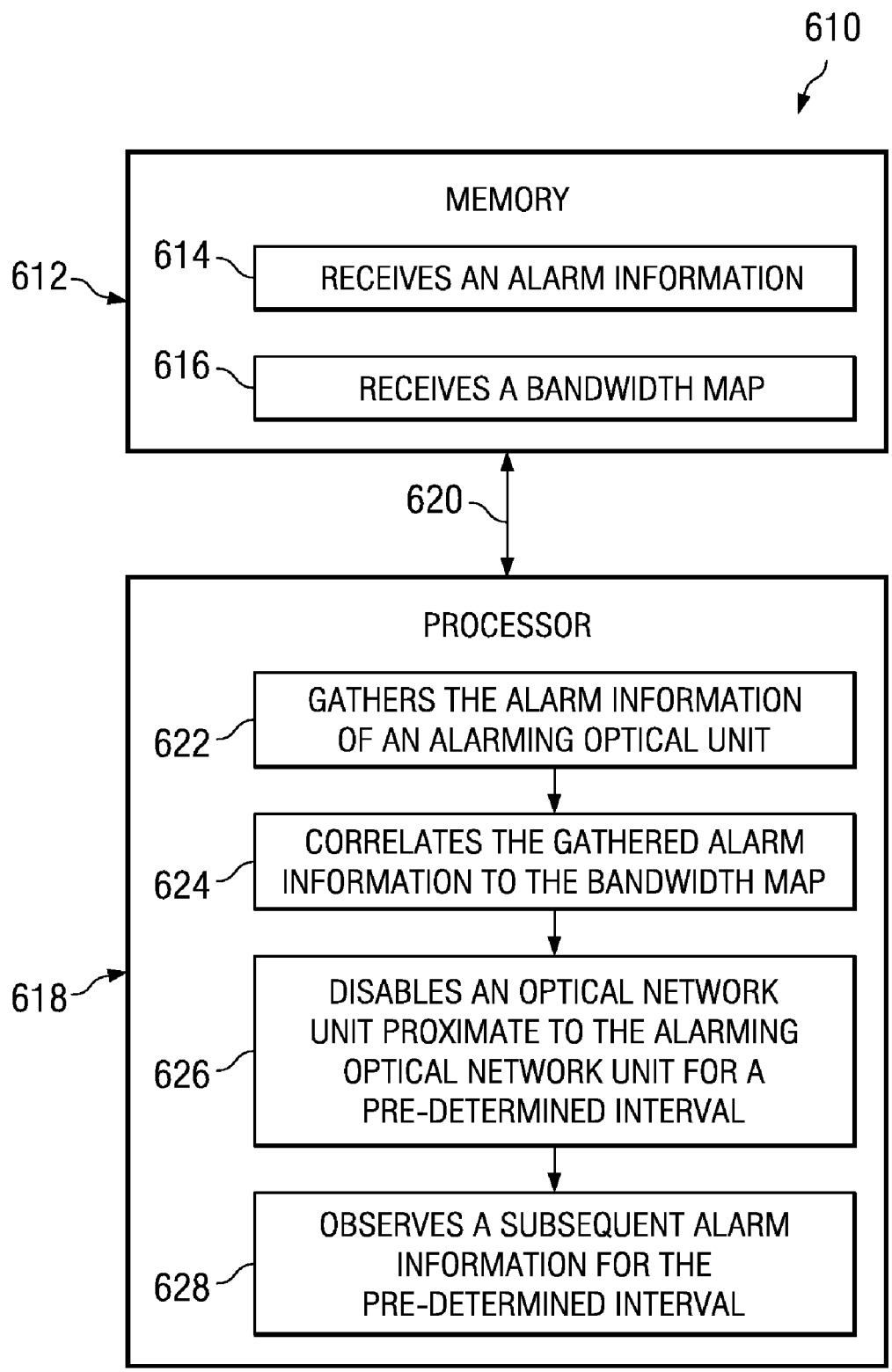
FIG. 6 illustrates a second system of passive optical network rogue optical network unit diagnostics in accordance with an embodiment of the present invention.

Referring now to FIG. 6, a second system 610 of passive optical network rogue optical network unit diagnostics is depicted. A system of passive optical network rogue optical network unit diagnostics, comprises, a memory 612 that receives at least one of, an alarm information 614 and a bandwidth map 616, and a processor 618 communicably coupled 620 to the memory, wherein the processor, gathers 622 the alarm information of an alarming optical network unit, correlates 624 the gathered alarm information to the bandwidth map, disables 626 an optical network unit proximate to the alarming optical network unit for a pre-determined interval, and observes 628 a subsequent alarm information for the pre-determined interval. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein form a circuit.

Figure 7:
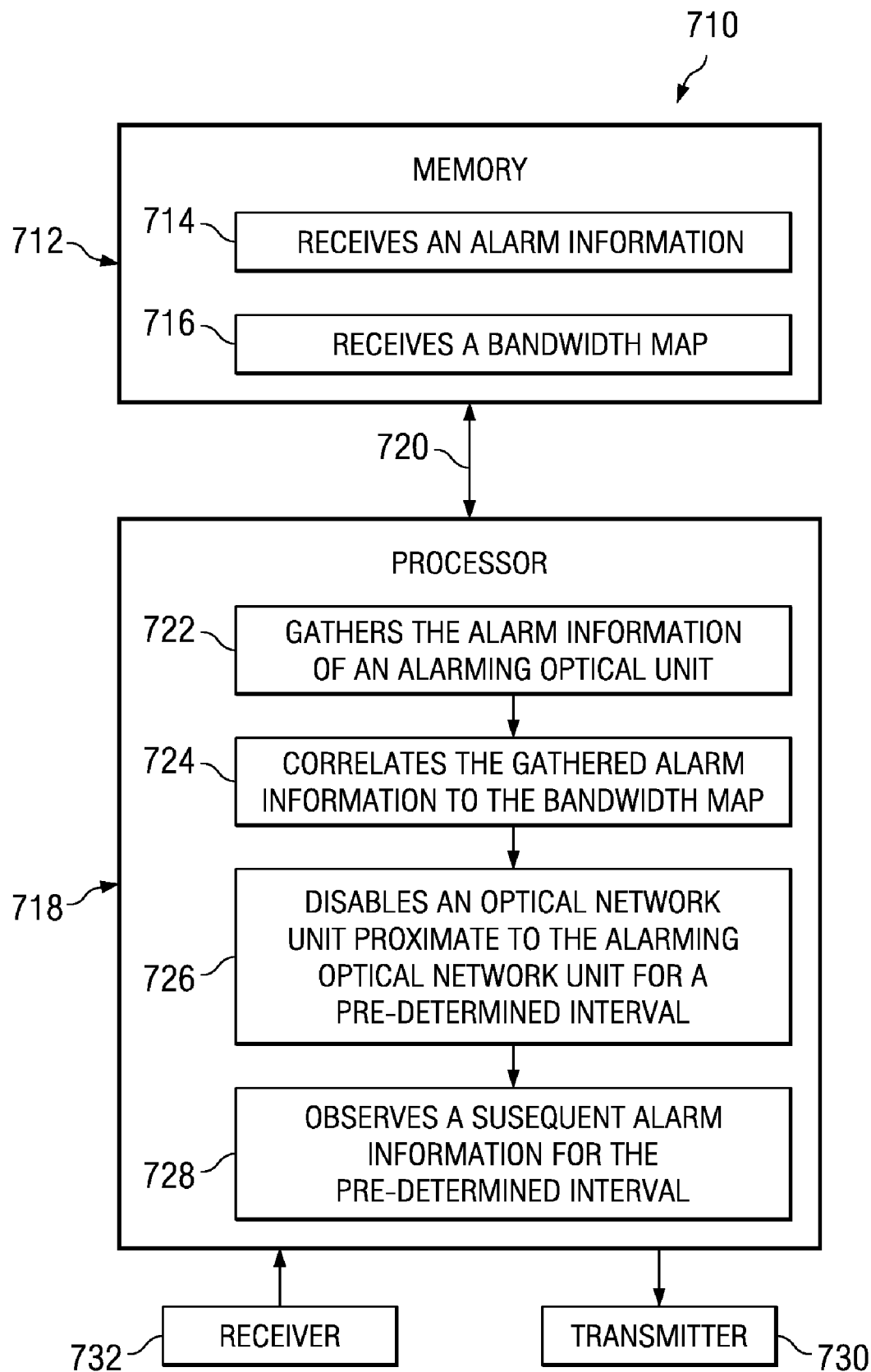
FIG. 7 illustrates a third system of passive optical network rogue optical network unit diagnostics in accordance with an embodiment of the present invention.

Referring now to FIG. 7, a third system 710 of passive optical network rogue optical network unit diagnostics is depicted. A system of passive optical network rogue optical network unit diagnostics comprises, a memory 712 that receives at least one of, an alarm information 714 and a bandwidth map 716, and a processor 718 communicably coupled 720 to the memory, wherein the processor, gathers 722 the alarm information of an alarming optical network unit, correlates 724 the gathered alarm information to the bandwidth map, disables 726 an optical network unit proximate to the alarming optical network unit for a pre-determined interval, and observes 728 a subsequent alarm information for the pre-determined interval. The system may also comprise an optical transmitter 730 coupled to the processor and an optical receiver 732 coupled to the processor. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein form a circuit.

Although an embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for passive optical network rogue optical network unit diagnostics, comprising:
   at a processor:
      detecting an alarm of a network;
      correlating the detected alarm to a bandwidth map;
      selectively disabling an optical network unit upstream to the detected alarm on the bandwidth map for a pre-determined interval;
      verifying a number of detected alarms during the pre-determined interval;
      re-enabling the selectively disabled optical network unit to verify an increase in the number of detected alarms, if the number of detected alarms reduces during the pre-determined interval; and
      permanently disabling the optical network unit, if the number of detected alarms increases after re-enabling the optical network unit.

2. The method of claim 1 comprising: collecting bandwidth mapping information.

3. The method of claim 1 comprising: determining an upstream optical network unit proximate to the detected alarm based upon the bandwidth map.

4. The method of claim 1 comprising: altering the bandwidth map.

5. The method of claim 2 comprising: flagging the selectively disabled optical network unit as rogue if there is a reduction in detected alarms during the pre-determine interval.

6. The method of claim 2 comprising: temporarily disabling the selectively disabled optical network unit if there is a reduction in detected alarms during the pre-determine interval.

7. The method of claim 1 comprising: comparing detected alarms to the selective disabling of the optical network unit.

8. The method of claim 1 wherein: the alarm is detected at an optical network unit.

9. The method of claim 1 wherein: the alarm is detected at an optical line termination.

10. A computer readable medium comprising instructions capable of being utilized via a hardware machine, the instructions comprising:

sequentially disabling an optical network unit on a bandwidth map proximate to an alarming optical network unit for a pre-determined interval;
observing alarm information for the pre-determined interval;
listing as rogue the sequentially disabled optical network unit if the observation indicates a reduction in the number of alarms during the pre-determined interval;
re-enabling the sequentially disabled optical network unit to verify an increase in the number of detected alarms; and
permanently disabling the optical network unit, if the number of detected alarms increases after re-enabling the optical network unit.

11. The instructions of claim 10 wherein: monitoring alarm information during the enablement of the rogue listed network units.

12. The instructions of claim 10 comprising: acquiring the number and type of observed alarms during the pre-determined interval to determine probable rogue optical network units.

13. The instructions of claim 10 comprising: analyzing the observed alarms to determine probable rogue optical network units.

14. A system of passive optical network rogue optical network unit diagnostics, comprising:
a memory that receives at least one of: an alarm information and a bandwidth map; and
a processor communicably coupled to the memory, wherein the processor:
gathers the alarm information of an alarming optical network unit;
correlates the gathered alarm information to the bandwidth map;
disables an optical network unit proximate to the alarming optical network unit for a pre-determined interval;
observes a subsequent number of alarms during the pre-determined interval;
re-enables the selectively disabled optical network unit to verify an increase in the number of detected alarms; and
permanently disables the optical network unit, if the number of detected alarms increases after re-enabling the optical network unit.

15. The system of claim 14 comprising: an optical transmitter coupled to the processor.

16. The system of claim 14 comprising: an optical receiver coupled to the processor.

* * * * *